(No Model.) 3 Sheets—Sheet 1.
J. W. MEAKER.
FARE REGISTER.
No. 357,725. Patented Feb. 15, 1887.
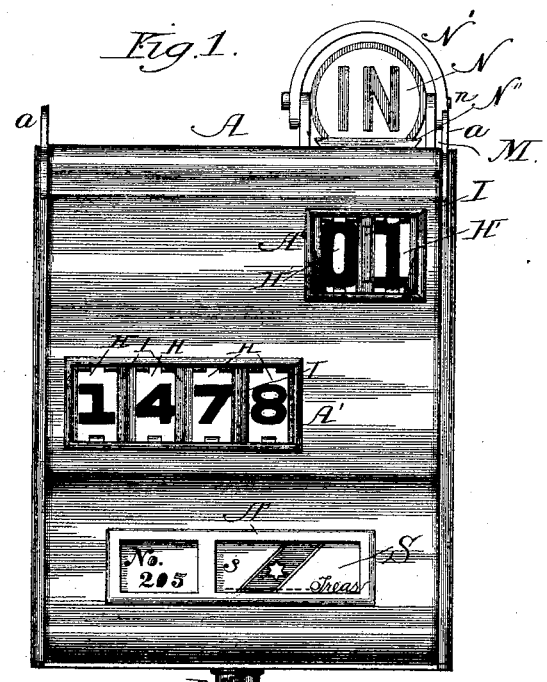
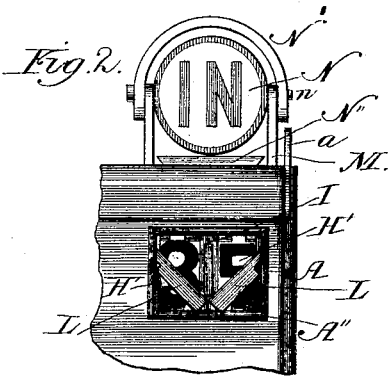
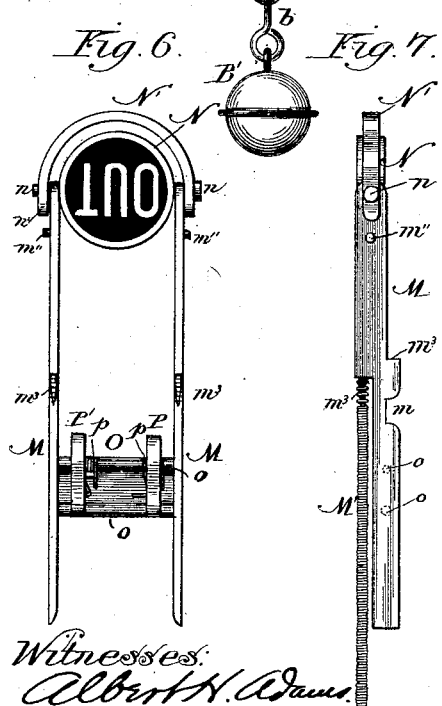
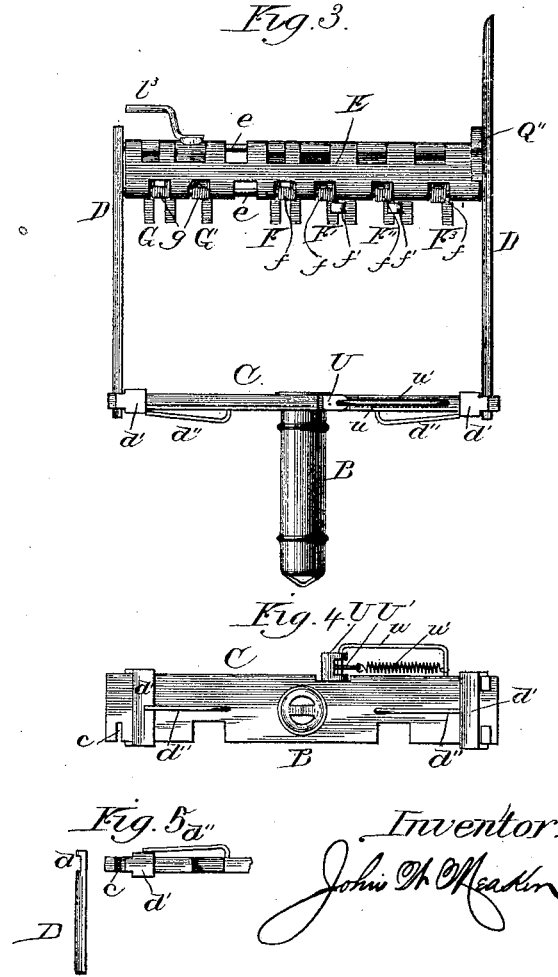
Witnesses:
Albert H. Adams.
Harry T. Jones.
Inventor:
John W. Meaker

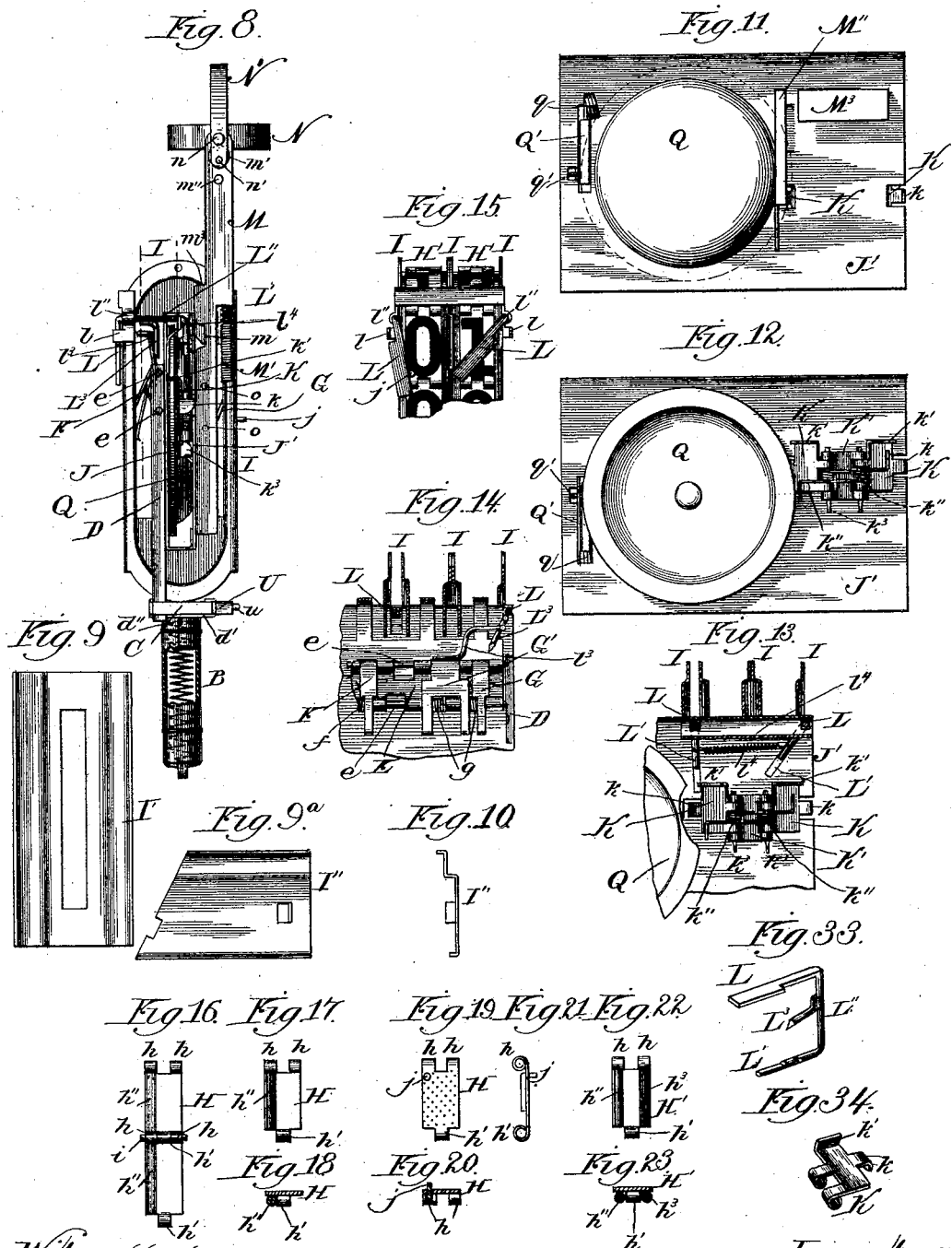

(No Model.) 3 Sheets—Sheet 3.
J. W. MEAKER.
FARE REGISTER.
No. 357,725. Patented Feb. 15, 1887.
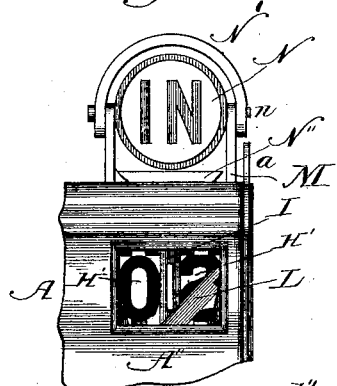
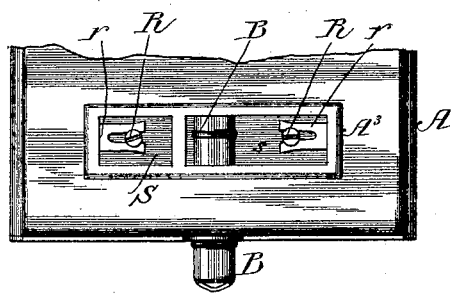
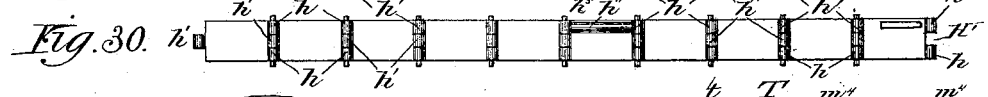
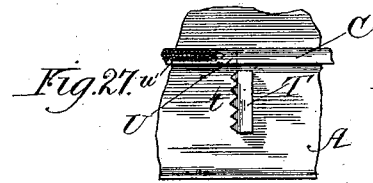
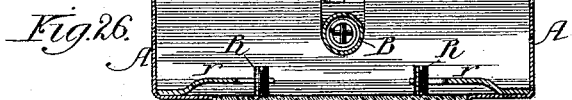
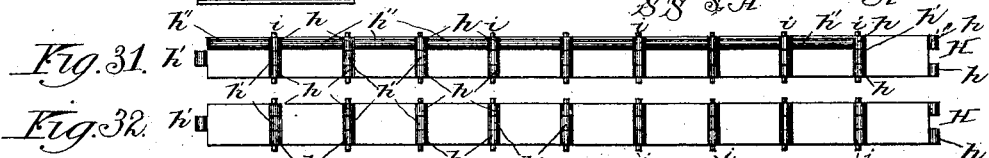
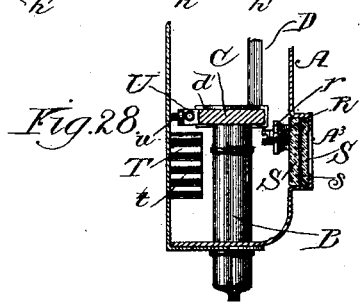
Witnesses:
Albert H. Adams.
Harry T. Jones.
Inventor:
John W. Meaker

UNITED STATES PATENT OFFICE.

JOHN W. MEAKER, OF CHICAGO, ILLINOIS, ASSIGNOR TO THE RAILWAY REGISTER COMPANY, OF SAME PLACE.

FARE-REGISTER.

SPECIFICATION forming part of Letters Patent No. 357,725, dated February 15, 1887.

Application filed June 19, 1886. Serial No. 205,608. (No model.)

*To all whom it may concern:*

Be it known that I, JOHN W. MEAKER, residing at Chicago, in the county of Cook and State of Illinois, and a citizen of the United States, have invented a new and useful Improvement in Fare-Registers, of which the following is a full description, reference being had to the accompanying drawings, in which—

Figure 1 is a front elevation; Fig. 2, a detail showing the canceler in position for canceling both figures of the trip-register; Fig. 3, a detail of the main pull; Fig. 4, a bottom view of the main pull with the bar on one side removed; Fig. 5, a detail showing the manner of putting together the pull; Figs. 6 and 7, elevations of the trip-pull, Fig. 7 showing the returning-spring attached; Fig. 8, an edge elevation with the outer case removed, showing the trip-pull raised; Figs. 9 and 9$^a$, side elevations of the holding-plates of the chain-frame; Fig. 10, an end view of Fig. 9$^a$; Figs. 11 and 12, plan views of the plate which carries the bell, showing opposite faces of such plate, and showing also the latch for the canceler; Fig. 13, a detail, partly in section, showing the latch for the canceler; Fig. 14, a detail, partly in section, showing the arm on the pawl of the tens-chain of the trip-register for rendering the pawl non-acting when the units-canceler is in sight;
Fig. 15, a detail showing one of the cancelers in use and the other out of use; Figs. 16, 17, 18, 19, 20, 21, 22, and 23, details of the chain-links; Fig. 24, a detail in elevation showing the units-canceler of the trip-register in use;
Fig. 25, a detail in elevation of the seal-locking devices; Fig. 26, a cross-section showing the devices for holding the seal; Fig. 27, a detail of the locking-ratchet for the main pull. Fig. 28, a detail in section showing the locking-ratchet of the main pull and the seal-holding devices; Figs. 29 and 30, plan views of the trip-chains; Figs. 31 and 32, plan views of the total-register chains; Fig. 33, a detail of the units-canceler; Fig. 34, a detail of the latch or catch for holding the cancelers.

This invention relates to certain improvements in fare-registers, similar to that for which Letters Patent of the United States No. 347,437 were granted to me August 17, 1886, and some of the parts are similar in their construction and operation to corresponding parts in said patent, and are shown herein to more fully represent the relation between the several parts composing the register as a whole.

The object of this invention is to improve the construction of the main pull in regard to the manner of connecting the parts together, so as to present rigidity in the direction of the pull and allow a sufficient yield to prevent breakage; to improve the construction and operation of the registering-chains; to improve the construction and operation of the trip-register by having the movement of the register-pull cancel the figures on the register-chains, and having such cancellation retained irrespective of the operation of the main pull until the register-pull has been operated a sufficient number of times to bring into view the zeros of the trip-register, thus preventing any tampering with the trip-register in regard to resetting the register or changing the numerals displayed thereon during the trip being made; to improve the devices for securing the seal in place; to improve the lock of the main pull against the operating of the register-chains or non-operating them and ringing the alarm from a partial pull only, and to improve, generally, the construction and operation of the several parts, as hereinafter more specifically described; and its nature consists in the several parts and combinations of parts hereinafter described, and specifically pointed out in the claims as new for attaining the objects sought.

In the drawings, A represents the outer case or shell, its front face provided with an opening, A', for displaying the numerals of the total-register, and with an opening, A'', for displaying the numerals of the trip-register, and with an opening, A$^3$, for the seal. Each upper corner, in the construction shown, is provided with a hook or eye, $a$, to receive the ends of a strap or other means for attaching the register to the operator, and this case is provided with a slide or cover forming the back, as shown and described in my said former patent, and the case can be of the several constructions shown and described in my said patent.

B is a hollow tube or stem passing through a hole in the end of the case, and having connected thereto by a link, $b$, a ball, B'.

C is a cross-bar lying within the case, and to which the inner end of the stem B is firmly secured in any suitable manner.

D represents the bars forming with the cross-bar C and stem B the main pull. As shown, the bars D are attached to the cross-bar C by having a groove formed in the end to leave a tongue, $d$, which enters a slot, $c$, formed in the side edge of the cross-bar C at the end, as shown in Figs. 4 and 5, and the attachment is completed by a slide, $d'$, fitting around the end of the bar C, and having projecting ears, one on each side, which, when the slide is advanced, cover the slot $c$ and lock the bar D firmly therein, as shown in Figs. 3 and 4, and these slides $d'$ are held against withdrawal by a spring or catch, $d''$, the free end of which is arranged to engage with the edge of the slide, the catch or spring being firmly secured at the other end to the cross-bar C, as shown in Figs. 3 and 4. This form of construction enables the bar D to be readily slipped into place and locked when in position, and the connection is one which allows a direct pull, and at the same time allows slight movement without liability of breakage, as might occur were the bars D brazed to or formed with the cross-bar C, and this construction also enables the bars to be readily replaced in case of breakage without replacing the entire pull, as all that is necessary to be done is to withdraw the slide $d'$ by disengaging the free end of the catch and then removing a bar D and replacing it with another one by inserting the tongue $d$ into the slot $c$, and then locking the parts together by the slide $d'$.

E is a support for the actuating-pawls of the register-chains, which support has on each side wires $e$, the ends of which enter the bars D, as shown in Fig. 3.

F F' F'' F³ represent actuating-pawls of the total-register chains, F being the pawl for the units-chains, F' for the tens, F'' for the hundreds, and F³ for the thousands. Each pawl is thrown outward or toward the chain with which it coacts by a spring, $f$, wound around one of the wires $e$, and arranged to properly engage the respective pawls.

G G' represent the pawls for operating the trip-register chains, also carried by the support E and held against their respective chains by springs $g$, wound around one of the wires $e$ and arranged to engage with the respective pawls. The support E and pawls F F' F'' F³ G G' are similar in construction and location to the corresponding devices of my said Patent No. 347,437, and in so far as relates to the pawls of the total-register their operation is the same, the pawls F'' F³ having stop-lips $f'$; but the tens-pawl for the trip-register is provided with an arm, $l^2$, (see Fig. 14,) which arm is attached to the butt-end of such pawl. The object of this arm is to render the pawl non-acting, when the units-canceler (hereinafter described) is in sight, by forming a cam for holding the pawl out of engagement with the chain so long as the canceler on the units-chain is in sight or use.

H represents the chains for the total-register. Each chain is formed of a series of ten links with a display-face on which is a numeral, the numerals running from 0 to 9, both inclusive. Each link at one end has ears $h$, and at the other end a single ear, $h'$, which fits between the ears $h$ of the next succeeding link when the chain is together, as shown in Figs. 31 and 32. The units, tens, and hundreds chains each have nine links, on which is a bridge, $h''$, running the entire length of the link on the opposite face from the display side, as shown in Fig. 31, and the remaining link of these chains is left plain. The entire series of links of the thousands-chain are plain links, as shown in Fig. 32. The links are connected, one to the other, by pins $i$, the ends of each pin projecting beyond the edge of the link on both sides and forming journals to enter the guide or track on which the chains are supported and travel, in the manner shown and described in my said Patent No. 347,437.

H' represents the chains for the trip-register. Each chain is formed of a series of ten links having a display-face on which are numerals running from 0 to 9, both inclusive. These chains are formed of links each having two ears, $h$, at one end and a single ear, $h'$, at the other end to fit between the two ears, as shown in Figs. 29 and 30, and the units-chain on the face opposite the display-face has each link, except one, provided with a bridge, $h''$, one link being left plain, as shown in Fig. 29, and one link having a bridge, $h^3$, opposite to the bridge $h''$, as shown in said Fig. 29. The tens-chain of this trip-register has nine plain links and one link provided with a bridge, $h''$. These chains H H' are similar in construction and operation to the corresponding chains of my said Patent No. 347,437; but the construction of the bridge $h''$ is different from the construction of the bridge in the chains of my said patent, being formed in this case of a rod running the entire length of the link on one side, as shown in Figs. 16, 17, 18, and 29, and this bridge on the chains of the total-register is for the purpose of holding the actuating-pawl clear of engagement with the hinge of the chain except when the plain link is reached, so that the tens-chain will remain stationary until one complete revolution of the units-chain has been had, and so on, as fully set forth for the operation of the chains of the total-register in my aforesaid patent. The bridges $h''$ of the trip-register chains are also for the purpose of holding the pawls out of engagement, and in addition thereto the units-chain has a bridge, $h^3$, which lines with the resetting-pawl of the units trip-chain to hold such pawl out of use when the zero of the units-chain is in view in resetting, and the tens-chain of this trip-register has a bridge, $h''$, for the same purpose as the bridge $h^3$ of the units-chain—that is, the holding of the resetting-pawl of the trip-pull out of use when the zero of the tens-chain is in view. The construction of the links of these chains H H' is shown in Figs. 16 to 23, both inclusive, and their arrangement when connected and straightened out is shown in Figs. 29, 30, 31, and 32. The chains H' of the trip-register each have a link provided with a pin, $j$, which projects beyond the display-face of the chain, as shown in Figs. 19, 20, and 21, the object of which is hereinafter described.

I represents the frames or guides for supporting the chains so as to allow each chain to be actuated by the pawls. These frames or supports are similar in construction and are attached to a central support or case, as shown and described in my said patent, and their form and manner of attachment are shown in Fig. 8.

I' I'' represent the plates for locking the chain-case, said plates being similar in construction and operation to the corresponding plates of my said patent, except that the plate I'' is formed as shown in Figs. 9$^a$ and 10 for the location of the canceling device.

J is the central support for the chain-frames, formed by bending a sheet of metal, as shown in Fig. 8, and of a size to enter the end openings in the pieces I.

J' is a plate corresponding in length and width to the length and width of the support J, and forming, when the parts are together, one side of the complete support for the frames I. This plate J is removable, and can be slid into or out of position, being unattached to the frames I, and, as shown, it is guided in being inserted and withdrawn by the turned ends of the support J, as in my said patent.

K represents latches located at that end of the plate J' over which the trip-chains pass, and mounted on the plate J' by a support, K', attached to the inner face of such plate, the support K' having on each side ears, between which ears on the latch K lie, and through which ears a pin or pivot, $k^3$, passes, pivotally connecting the latch with the support. Each latch K has a projection, $k$, which passes through a slot or opening in the plate J', so as to lie outside of the plane of the outer face of the plate, and on one edge of each latch is a projection, $k'$, formed by turning up the metal of the latch itself or attaching a piece to the latch. Each latch K is held with the projection $k$ projected beyond the face of the plate J' by a spring, $k''$, coiled around the pivot $k^3$ of the latch, and having one end to engage with the latch and the other to engage with the support K', as shown in Figs. 12 and 13.

L represents the cancelers, located and operating over the chains of the trip-register, a canceler being provided for each chain, as shown in Fig. 15, and each canceler, as shown, is formed by flattening out a piece of wire or other suitable material and coloring the exposed face a bright red or other quickly-discernible color. The canceler L stands parallel with the face of the chain with which it is used, and is carried by a cross-wire, L'', at the other end of which is an arm, L', and these parts L L' L'' can be formed of the same piece of wire or of two independent pieces secured together. The cross-wire or support L'' of the units-canceler only, between the canceler L and arm L', has another arm, L$^3$, as shown in Figs. 8, 14, and 33, and this arm L$^3$ is so located in relation to the arm or cam $l^3$ on the pawl G' of the tens-chain as to form a cam by which the pawl will be held out of action while the canceler of the units-chain is in view. The arm L' of each canceler L is arranged to be held by the stop $k'$ of the latch K when the canceler is out of use, and be disengaged from such latch when the canceler is thrown into use, and in Fig. 13 the arm L' of the units-canceler is shown thrown into position for use, and the arm L' of the tens-canceler is shown held out of use by the stop $k'$ of its latch K, and these arms are connected, one with the other, by a coiled spring, $l^4$, as shown in Fig. 13, so that when an arm is released from its stop $k'$ the spring will act and throw the arm in and throw the canceler across the face of the chain, as shown in Figs. 2, 15, and 24. Each canceler is held against being thrown too far out by a stop, $l$, attached to the edge of the frames I on each side of the chains, as shown in Figs. 8 and 15, and the cross-piece or support L'' of each canceler is mounted in suitable bearings, $l''$, also attached to the frame-pieces I, as shown in Figs. 8 and 15. Each canceler is thrown out of use by the travel of the chain with which it coacts through the projecting pin $j$ on the zero-link of such chain, which pin, when the canceler is across the chain, as the chain is advanced, strikes the edge of the canceler and carries it around out of use, and as the canceler is carried around the arm L' moves therewith and passes back of its stop $k'$, by which the canceler is held out of use until the stop $k'$ is released from the arm L', as hereinafter described.

M is a pull for resetting the trip-register, formed of two bars, each similar in construction, as shown in Figs. 6 and 7, each bar having one edge cut away and provided with a screw or other attaching device to receive the end of a coiled spring, M', the other end of which is attached to a screw or other device, $m^4$, on the bottom of the main case A. (See Fig. 26.) The opposite edge from the spring side of the pull-bar is provided with a recess, $m$, Figs. 7 and 8, into which, when the pull is at rest, the projection $k$ of the latch K enters, and the upper end of one of the bars of the pull M is provided with a hole, $m'$, Fig. 8, and just below this hole is a stop-pin, $m''$, a similar pin $m''$ being provided for the other bar of the pull, as shown in Fig. 6, and these pins $m''$ limit the downward draw of the pull by the springs M', so that when at rest the opening $m$ will be in line with and receive the projection $n'$, as hereinafter described. One bar of the pull M is outside of the end frame, I, adjacent to the plate J', as shown in Fig. 8, and the other bar of this pull lies adjacent to a guard or guide, M'', attached to the face of the plate J', and on this plate J', at right angles to the guide M'', is a plate, $M^3$, (shown in Fig. 11,) which forms a guard for holding the resetting-pawl out of position when the pull is out of use, the inner bar of the pull passing in the space between the plates or guides M'' and $M^3$.

N is a button having on one side the word "Out" and on the opposite side the word "In." This button is pivoted between the outer ends of the pull-bars, as shown in Fig. 6, by suitable pivots or pins, $n$, and outside of the bars of the pull M is pivoted one end of a semicircular piece or bail, N', which forms a means for operating the pull in connection with the button N, and one end of the bail N' has an inwardly-projecting pin, $n'$, which enters the opening $m'$ and holds the handle or bail N' from dropping, so as not to be easily caught. The upper end or wall of the shell A, in line with the button N when straight, is provided with a cup, N'', which receives the edge of the button N and holds it stationary when the pull M is at rest, as shown in Fig. 1.

O is a support located between the bars of the pull M and connected with the bars at each end by wires $o$, such wires passing through the edges of the support.

P P' represent the pawls for resetting the trip-chains from the pull M, each pawl having its free end to engage with the hinges of the links of the chain, and being held to so engage by springs $p$, coiled around one of the wires $o$, with a free end to engage the pawl and hold it in position to engage the chain-links.

Q is the bell carried by the plate J' and struck by a hammer, Q', mounted on a coiled spring, $q$, and located in a slot formed in the plate J', the hammer having a side projection, $q'$, to be engaged by a cam, Q'', carried by one of the bars D of the main pull, so that with the outward movement of the pull the cam Q'' will engage the projections $q'$ and raise the bell-hammer, to have such hammer returned by the spring $q$ after the cam has passed the projection, and strike and ring the bell.

R, Figs. 25, 26, and 28, represents screws notched or recessed at both ends, and carried by arms or projections $r$, running from each side of the case A inward, to bring the screws in line with the seal-opening $A^3$.

S represents protectors, of glass or other transparent material which can be broken when required, and between which is located a seal, $s$, formed of a strip of paper having thereon the number of the register and countersigned by some officer of the company to which the register belongs. This strip of paper is attached to the inner piece of glass S. The outer glass is dropped into the seal-opening $A^3$, resting on the flange of the opening $A^3$, and the other piece of glass S is then dropped into the seal-opening, and the two pieces, with the seal between them, forced tightly and snugly against the edges of the seal-opening by turning down the screws R.

T is a ratchet-bar provided on one edge with a series of ratchet-teeth, $t$. This bar is firmly secured to the cover or back of the case A, as shown in Figs. 26, 27, and 28, in line, or nearly so, with the center of the pull-stem B.

U is a pivoted dog carried by the cross-bar C, and held in place in the construction shown, so as to turn freely, by a wire staple, $u$. (See Figs. 3 and 4.) This dog U has an arm, U', to which is secured one end of a coiled spring, $u'$, the other end of which is secured to the arm of the staple $u$, as shown in Fig. 4, so that the dog is free to turn on its pivot, but is returned to its normal position by the action of the spring $u'$ and arm U'. The acting end of this pawl engages with the ratchet-teeth $t$ as the bar C is drawn down by the pull-stem B, and is returned by the coiled spring located in the stem B, by which means the bar C and the main pull are locked against movement after a partial pull has been made in either direction until the complete pull in the direction first started in has been completed, thus preventing a partial movement of the pull outward and any return until the completion of the outward movement, or the partial return of the pull and another pull outward until the completion of the return movement.

The parts are assembled in essentially the same manner as described in my said Patent No. 347,437, so far as relates to the securing of the frames or guides I for the chains on the support J and the placing of the chains in position on the guides and connecting the pulls in place, except that in the present construction the main pull is independent of the trip-pull, so that either pull can be operated without affecting the operation of the other pull.

The latches K are attached to the plate J' in proper relation to the pull M to have the lugs or projections $k$ on the respective latches enter the notches $m$ of the respective pull-bars when the pull is down or at rest, and the cancelers are located in such relation to the display-opening A'' that when in use they will stand across such opening in front of the numerals on the trip-chains, these parts K and L being secured in position with the assembling of the register as a whole. The pawl-support E is slipped into position within the opening therefor in the frame of the register-chains, and the ends of the wire $e$ are slipped into the holes therefor in the bars D of the pull on each side, and these bars are connected to the cross-bar C by slipping the tongue $d$ into the slot $c$ and securing the parts in position by the slide $d'$ and catch $d''$, as already described, and the remaining bar D of the pull is slid into position and secured at the same time, and the support O for the pawls P is secured in position in a like manner by slipping it into place in the chain-frame and inserting the ends of the wires o into the holes therefor in the bars of the pull M, and the pulls are held in position by the end plates, I'.

In use the outward draw of the main pull through the stem B and ball B' carries down the actuating-pawls for the chains, causing the pawls to successively act and advance the respective chains, bringing into view the numerals on the chain-links, each pull advancing the units-chain of the total-register one link, and the tenth pull advancing the tens-chain and the units-chain one link simultaneously, and each hundredth pull advancing the hundreds-chain with the tens and units chains simultaneously, and so on, and this outward draw of the main pull also actuates the pawls for the trip-registering chains in a like manner, each pull advancing the units-chain of the trip-register one link, and the tenth pull advancing the tens-chain with the units-chain, displaying at the sight-opening the numerals indicating the registry.

The trip-register is used principally to indicate the number of fares taken each half-trip, and for this reason the "Out" and "In" signs are provided, the display of the "Out" indicating that the register is being used on an out half-trip, and the display of the "In" that it is being used on an in half-trip, and it is the practice to change this sign at the terminus of each half-trip, and at the same time to reset the trip-register back to zero, which is effected by drawing out the pull M and causing the pawls P P' to engage the trip-register chains and carry them successively forward until the zero is reached and displayed at the opening A', at which point the pawls ride over the bridge $h^3$ on the units-chain and the bridge $h''$ on the tens-chain, preventing any further advance of such chains from the resetting-pull, and leaving the chains in position to be advanced by the main pull only. This resetting of the trip-register chains might be utilized for displaying an incorrect registry, in that the operator might advance the chains through the resetting-pull after a few fares had been taken, and then through the main pull continue his registry, displaying a false registry instead of a true one; and to obviate this tampering with the trip-register the cancelers L are provided, which cancelers are operated by the actuating of the resetting-pull M. The withdrawal of the bars of the resetting-pull causes the edge of the bar, as the notch m passes over the projection l, to raise the latch K by the projection being raised by the passing thereunder of the edge of the bar, and this raising of the latch K releases the arm L' from the stop k', so that the spring l' will carry the arm around, throwing the canceler L across the face of the register-chains, and this operation will occur with either or both chains, accordingly as only one or both chains have been advanced to display their numerals. The cancelers will remain across the face of the chains until the zero-link is carried around by the resetting-pull, and as this link passes around the pin j thereon strikes the edge of the canceler L and carries it back out of use, and if the resetting-pull is at its normal position and there left the canceler will not be turned, as the notch m will receive the projection l and lock the canceler out of use, and the canceler will be held out of use until the lock of the notch m and projection l is made by the pin j as long as the zero remains in view; but if the chain is advanced by the main pull to bring the figure 1 into view, and at the same time the notch m is not engaged with the projection l, the canceler is not held by the engagement of the arm L' with the stop k', so that as the pin on the zero passes forward the canceler is presented to view across the face of the numerals, and will remain there until the chain has passed a complete revolution, either by resetting or by the action of the main pull. This canceler indicates that the operator is not using the register in a correct manner if it is presented to view across the face of a numeral while the main pull is being operated, as when the register is used properly the canceler should be out of sight except when the operator is resetting the trip-register chains, and by the use of this canceler it is easy to determine whether the operator is resetting his trip-register to indicate or show a false entry, or whether he is using the register as a whole in a proper manner.

The register is sealed, after the registering mechanism is placed in the case and before the back thereof is locked, by inserting the seal s between the pieces S, and securing such pieces in the seal-opening by the screws R, as already described; and when sealed the back of the case is to be slid into place and there locked against removal until the seal is broken, and the breaking of this seal indicates that the register has been tampered with.

The outward draw of the main pull carries with it the bar C, to which the dog U is attached, and the actuating end of this dog passes over the teeth t of the bar T in such manner that the pull cannot return back to its normal position until the full stroke has been completed, as the dog will catch in one of the teeth t and prevent the return of the pull at any point of its outward draw after the first tooth has been passed, the dog being turned by the act of drawing the pull down to present its actuating end in line to engage with the teeth t by striking against the teeth, and on the return movement the pull will be prevented from being drawn out until the full return has been made by this same pawl striking the teeth t, which prevents any outward draw after the bottom tooth has been passed, the dog being turned to engage the teeth by striking against the teeth. It will thus be seen that this dog U, in connection with the ratchet T, prevents a partial movement of the pull in either direction after the draw has been started until the pull is completed in the direction in which it started.

As shown, the ratchet is stationary and fixed to the back of the case, and the dog moves with the pull; but it is evident that the dog might be stationary and fixed to the back of the case and the ratchet be mounted on the cross-bar C to move with the pull, so that the pull will be locked against return in an opposite direction to that from which it was started. The ratchet in this case will be located in a recess in the cross-bar C, the edge of which is milled, so as to present a square end face against which the face of the ratchet will strike in turning, and thereby limit the amount of turning and prevent the ratchet from being thrown over out of use by a rapid or quick jerk on the pull.

The attachment of the bars D of the main pull to the cross-bar C through the tongue, slot, and slide makes a loose connection, and at the same time a rigid one in the direction of pull, by which accurate fitting of the bars D within the openings of the chain-case in which they work is not required, as the loose joint allows either bar to adjust itself to any inequalities in the path of its travel, by which means the case J may be out of line or depressed at its center without interfering with the operation of the bar, and this loose connection allows a play by which any binding of the bar in moving in or out is prevented, as either of the bars will adjust itself to the line in which it is to travel, irrespective of the other bars D.

The cancelers are removed from across the face of the chains by the action of either pull when the zero of the chain is reached and advanced to bring the pin $j$ in contact with the edge of the canceler and carry the canceler around out of use. The canceler for the units-chain is provided with an arm, $L^3$, as already described; but this arm is omitted from the canceler of the tens-chain, as the forming of a cam is not required with such chain, there being only the units and tens chains in use. The cam formed by the arm $l^3$ on the tens-chain and the arm $L^3$ act to prevent an advance of the tens-chain from the main pull so long as the canceler is in sight or across the units-chain, as when the canceler is in view the arm $L^3$ is carried around so that the arm $l^3$ will engage therewith and throw the pawl for the tens-chain down at its acting end and prevent engagement with the tens-chain; but when the canceler of the units-chain is removed or out of sight the arm $L^3$ is then out of position to receive the arm $l^3$, leaving the pawl of the tens-chain free to engage with the chain by the operation of the main pull. This arrangement prevents the operator from ringing up a high number of fares and then resetting the tens-chain to indicate a low number, as a movement of the tens-chain will not take place on the operation of the main pull until the units-chain has been reset to zero, carrying the canceler thereof out of sight—that is, if the operator from the main pull had taken and indicated eighty-two fares and then by the resetting-pull advanced the tens-chain to 0 and the units-chain to 4, the next operation of the main pull would simply display 5 on the units-chain, as the arm $L^3$ would be in position to receive the arm $l^3$ of the tens-chain and prevent the pawl of that chain from acting, and no action of this pawl would take place until the units-chain had been advanced to cause the zero-link thereof, through the pin $j$, to carry out of sight the canceler of the units-chain, and such chain would continue to advance a complete revolution before the units-chain would be operated, as the pawl of the tens-chain will not operate until a complete revolution of the units-chain has been had from the main pull, bringing the plain link of that chain into position for the pawl of the tens-chain to drop and advance the tens-chain, such pawl riding over the bridges $h''$ of the units-chain during the one revolution. If the resetting-pull is moved slightly and sufficient to clear the button from its cup to be turned, such movement will throw the canceler across the chain, and the canceler will there remain until the zero-link has been brought around either by the resetting-pull or the main pull to have its pin $j$ return the canceler, and if the canceler of the units-chain is carried out of sight when both cancelers are up or in view the tens-canceler will remain in position until its chain has been carried around by either one or the other of the pulls to have the pin $j$ on its zero-link carry the canceler out of sight, so that it will be seen that under any and all conditions the canceler will be in operation to indicate any misuse of the register until the register is being used correctly. The lock of the bail N' against a complete revolution also acts to form a support in turning the button, as by pressing on the bail in one direction and on the button in the opposite direction the button can be readily turned. The pins $m''$ form a stop by striking against the top of the case, so that by turning the button crosswise the pull cannot be forced too far inward, and the limit of outward pull is controlled by the shoulders $m^3$ on the edge of the pull-bars, which strike against the under side of the top when the pull has been withdrawn to the extent required to operate the chains by the resetting-pawls. These stops $m''$ $m^3$ prevent any movement of the pull M in either direction beyond that required for resetting purposes, and when the pull M is at rest the resetting-pawls P P' lie under the guard $M^3$, by which they are folded down so that their acting ends will not strike against or engage with the chains, leaving the chains perfectly free for the action of the main-pull pawls. As shown, the cross-rods or supports L'' of the cancelers are further held by a plate, $l^4$, secured to the plate or support J, and having openings or holes, one for each cross-rod L'', by which the rods are supported at the end carrying the arm L'.

What I claim as new, and desire to secure by Letters Patent, is—

1. The bar C, having the slots $c$ at each end, in combination with the bars D, each having a tongue, d, slide d', and catch d'', for connecting the parts together, substantially as and for the purposes specified.

2. A chain for registering purposes, having on one face of each link a display-numeral, and having one or more links provided with bridges h'', each running the entire length of a link, at or near one edge thereof, substantially as and for the purpose specified.

3. The combination, with a series of actuating-pawls, of a series of chains provided with display-numerals, and each chain having thereon bridges h'', each running the entire length of a link, at or near one edge thereof, for the pawls to ride over, substantially as and for the purpose specified.

4. The combination, with the tens-chain having display-numerals on one side and bridge h'' on the other side of one of the links, and the units-chain provided with display-numerals on one side and with bridges h'' and the bridge $h^3$ on the opposite side, of the actuating-pawls G G', for moving the chains, substantially as and for the purpose specified.

5. The combination, in a trip-register, with traveling chains provided with display-numerals, of a main pull for advancing the entire series of chains, and a resetting-pull for setting the trip-register chains, each pull being independent of the other, substantially as and for the purpose specified.

6. A series of chains provided with display-numerals on the face of the links, in combination with the main pull carrying actuating-pawls for advancing the entire series of chains consecutively, and a resetting-pull carrying pawls for advancing the trip-register chains independent of the main pull, substantially as and for the purpose specified.

7. A series of chains, H, provided with a numeral on the display-face of each link, and having bridges h'', as shown and described, forming a total-register, and chains H', having a display-face with a numeral on each link, and provided with bridges h'' $h^3$, as shown and described, forming a trip-register, in combination with a main pull carrying pawls F F' F'' $F^3$ G G', and a resetting-pull carrying pawls P P', each pull acting independent of the other to advance the chains, substantially as and for the purpose specified.

8. The combination, with the chains of a trip-register having display-numerals thereon, of a canceler operated by the act of resetting the chains to cross the numerals, substantially as and for the purpose specified.

9. A canceler, L, operating across the display-opening of the trip-register, in combination with a latch operated by the resetting-pull for throwing the canceler across the opening by the movement of the pull, substantially as and for the purpose specified.

10. The canceler L and arm L', in combination with the latch K, having projection k and stop k', and bar of the pull M, having the notch m, for holding the canceler out of use and releasing it for use, substantially as specified.

11. The canceler L, arm L', and spring $l^4$, in combination with the catch K, having projection k and stop k', and bar of the pull M, having the notch m, for holding the canceler and releasing the same to be thrown across the display-opening, substantially as and for the purpose specified.

12. The combination, with a canceler and the traveling chains of a register, of the arm $l^3$ and arm $L^3$, for preventing the advance of the tens-chain when the canceler is in sight on the units-chain, substantially as specified.

13. The chains H', having the zero-link provided with a projecting pin, j, in combination with the canceler L, for carrying the canceler out of use, substantially as specified.

14. The combination, with the canceler L and the bars of the pull M, of the button N, having its faces provided with the words "In" and "Out" for indicating the direction of the trip, and the cup N''', for receiving the edge of the button and preventing the turning thereof except by a partial withdrawal of the pull which sets the canceler, substantially as specified.

15. The bar T, having the ratchet-teeth t, in combination with the dog U, carried by the cross-bar C of the main pull for dogging the pull in either direction against return until a complete pull has been made, substantially as and for the purposes specified.

JOHN W. MEAKER.

Witnesses:
ALBERT H. ADAMS,
HARRY T. JONES.